United States Patent [19]

Gross

[11] Patent Number: 4,557,159

[45] Date of Patent: Dec. 10, 1985

[54] DRIVING MECHANISM FOR SLAT CURTAINS

[76] Inventor: Hans Gross, Fahrionstrasse 45, D-70000 Stuttgart 40, Fed. Rep. of Germany

[21] Appl. No.: 541,088

[22] Filed: Oct. 12, 1983

[30] Foreign Application Priority Data

Feb. 24, 1983 [DE] Fed. Rep. of Germany ....... 3306407

[51] Int. Cl.$^4$ .................. F16H 37/06; F16H 3/44; E06B 9/26; F16D 55/00
[52] U.S. Cl. ..................... 74/665 GA; 74/789; 74/801; 74/10.2; 160/166 A; 160/176 R; 188/71.1
[58] Field of Search ......... 74/665 G, 665 GA, 665 F, 74/665 S, 665 K, 789, 801, 526, 10.2; 160/168, 176 R, 166 A; 464/39; 188/71.1, 72.1

[56] References Cited

U.S. PATENT DOCUMENTS

| | | | |
|---|---|---|---|
| 1,203,956 | 11/1916 | Albanese | 74/526 X |
| 1,339,052 | 5/1920 | Bauer | 74/10.2 |
| 2,330,734 | 9/1943 | Paul | 464/39 |
| 2,644,439 | 7/1953 | Behringer | 464/39 X |
| 3,434,356 | 3/1969 | Weiss | 74/10.2 |
| 3,789,905 | 2/1974 | Saito | 160/176 X |
| 4,272,973 | 6/1981 | Fu-Tsai | 464/39 X |
| 4,381,811 | 5/1983 | Frentzel et al. | 160/168 R |

FOREIGN PATENT DOCUMENTS

| | | |
|---|---|---|
| 2161117 | 6/1973 | Fed. Rep. of Germany ...... 160/168 |
| 2223610 | 11/1973 | Fed. Rep. of Germany . |
| 2340870 | 3/1975 | Fed. Rep. of Germany . |
| 2412494 | 10/1975 | Fed. Rep. of Germany . |
| 2737145 | 3/1979 | Fed. Rep. of Germany . |
| 2853763 | 6/1980 | Fed. Rep. of Germany ... 160/166 A |
| 18864 | 11/1980 | France . |

*Primary Examiner*—Leslie A. Braun
*Assistant Examiner*—Stephen Andrews

[57] ABSTRACT

A driving mechanism for slat curtains, the slats of which can be displaced in a direction transverse to their longitudinal axis and rotated about the longitudinal axis of the slats, comprising a gearing having one drive end and two power take-offs of different torques for connection to a transport rod (7) effecting the longitudinal displacement of the slats and a tilt rod (6) effecting their rotary movement, the rotary movement of the power take-off coacting with the tilt rod being limited by stops arranged on coaxial parts rotatably seated for being driven by the power take-off associated with the tilt rod, coacting stops being arranged along the same circular paths, is characterized in that the rotatably seated parts take the form of at least two disks (30, 32) of substantially identical diameter arranged in parallel to each other and that the one outermost disk is coupled to the power take-off associated with the tilt rod (6), that the rotary movement of the other outermost disk (32) is limited by a stop which is fixed in position relative to the housing of the driving mechanism, and that every two directly neighboring disks carry the coacting stops (37, 38) arranged along the same circular paths. Thus, a simple and space-saving arrangement is achieved.

3 Claims, 9 Drawing Figures

DRIVING MECHANISM FOR SLAT CURTAINS

The present invention relates to a driving mechanism for slat curtains, the slats of which can be displaced in a direction transverse to their longitudinal axis and rotated about the longitudinal axis of the slats, comprising a gearing having one drive end and two power take-offs of different torques for connection to a transport rod effecting the longitudinal displacement of the slats and a tilt rod effecting their rotary movement, the rotary movement of the power take-off coacting with the tilt rod being limited by stops arranged on coaxial parts rotatably seated for being driven by the power take-off associated with the tilt rod, coacting stops being arranged along the same circular paths.

A mechanism of this type has been known from German Patent Specification No. 24 12 494. In the known mechanism, the parts carrying the stops take the form of two coaxial gears with slightly differing numbers of teeth, both gears being driven by the same driving gear. The stops are formed by a projection provided on one gear and a groove in the other gear which is engaged by the before-mentioned projection. The production of this known mechanism is, however, relatively costly.

Now, it is the object of the present invention to provide a mechanism of the type described before, but of a design which simplifies its production. According to the invention, this object is achieved by the fact that the rotatably seated parts take the form of at least two disks of substantially identical diameter arranged in parallel to each other and that the one outermost disk is coupled to the power take-off associated with the tilt rod, that the rotary movement of the other outermost disk is limited by a stop which is fixed in position relative to the housing of the driving mechanism, and that every two directly neighboring disks carry the coacting stops arranged along the same circular paths.

The advantage of this invention is to be seen in the fact that the production of the disks carrying the stops is very easy. Further, it is an additional advantage that the space requirement of the disks is relatively small so that they help to keep the dimensions of the device reasonably small, as the mechanism must usually be accommodated in a head rail in which the slat curtain is held by the upper ends of the slats and in which the different tilt carriages carrying one strap each are arranged. Finally, it is a further advantage of the invention that the number of revolutions performed by the power take-off associated with the tilt rod before the power take-off associated with the transport rod is activated can be easily varied by varying the number of disks carrying the projections. Although in numerous slat curtains of the described type an idle path of approx. 4.5 revolutions of the tilt rod is required, the present invention permits to increase or reduce this idle path if this should become necessary.

A particularly simple design of the stops is proposed by one embodiment of the invention in which each stop takes the form of a projection provided on one edge of the disk, preferably the outer edge of each disk, and extending substantially perpendicularly to the plane of the disk and into the plane of the neighboring disk. The projection projects radially beyond the edge of the disk. This permits the realization of another embodiment in which the neighboring disks are arranged immediately adjacent each other and in which the length of the projection is maximally equal to the thickness of the disk.

The before-mentioned projection may be provided also on an inner edge of the disk if the disk is conveniently designed as annular disk. However, a stop arranged on the outer edge does not restrict the angle of rotation of the disk to the same extent as a stop of identical width arranged on the inner edge, and considering that a stop arranged on the outer edge is subjected to lower torques, there even exists the possibility to make this stop a little thinner than would be necessary if it were arranged on the inner edge. The immediately adjacent arrangement of the disks provides an extremely compact, space-saving design. There is no need for special means for retaining the disks in their position since the disks support each other. The frictional forces effective between the disks are advantageously kept low.

In one embodiment of the invention, the disk driven by the power take-off associated with the tilt rod is positively coupled with the power take-off associated with the tilt rod, via radial projections arranged in a central opening of the disk, which coupling comes into effect at least after a certain idle path has been overcome between the tilt rod and the said disk. If such an idle path is provided, it may be possible, if a specific idle path of, say, 4.5 revolutions is required, to provide a lesser number of disks as compared with an embodiment in which the said outermost disk is connected with the power take-off for the tilt rod, for permanent rotation therewith. The described coupling to the power take-off for the tilt rod can be realized in an extremely simple manner.

The other outermost disk which is the farthest remote from the first-mentioned outermost disk driven by the power take-off for the tilt rod must coact with some fixed stop which acts to limit the rotary movement of the said other outermost disk. According to one embodiment of the invention, this stop is formed by another coaxial disk which is fixed to the housing and provided with a stop which coacts with the neighboring disk. The advantage of this arrangement is to be seen in the fact that the said other coaxial disk which cannot rotate in any direction, enables the idle path to be very exactly adjusted to the desired value, without greater difficulties. For, if the last rotating disk neighboring the said additional disk were to coact with a stop fixed to the housing, it would perhaps be difficult to vary the position of this fixed stop, whereas the said other coaxial disk may be given different configurations which means that when the disk is fixed to the housing against rotation, the stop coacting with its neighboring disk may assume different positions, depending on the particular configuration. To vary the position of the stop, one may initially produce the said other disk, for instance by injection-moulding, with a plurality of projections and then remove all projections but one.

The known arrangement described above is already provided with a slipping clutch in the power take-off associated with the transport rod, which slipping clutch comprises a first clutch part which is driven by the gearing and pressed by spring action against a drive element for the transport rod. In this known arrangement, a conical surface of a male part of the slipping clutch coacts with a conical surface of a female part of the clutch. The torque that can be absorbed by this slipping clutch is to a very great extent dependent upon the condition of the surface of the coacting parts. Even very slight changes in this condition, for instance if the surfaces should come into contact with grease, may already result in important variations of the slipping moment. In contrast, it is proposed by one embodiment of the invention, which may also be realized independently of the other aspects of the invention, that the two parts pressed together by spring action be coupled for rotation with each other by at least one wedge-shaped projection engaging a wedge-shaped groove of matching form provided in the neighboring part in such a manner that the projection slips out of the groove when a specific torque defined by the wedge angle and the coefficient of friction and the force of the spring is exceeded.

The advantage of the invention is to be seen in the fact that the wedge-shaped configuration of the projection permits a quite considerable torque to be transmitted between the coacting parts, even if one assumes a very low coefficient of friction, provided that the wedge angle is selected sufficiently acute. Another advantage of the invention is to be seen in the fact that the slipping of the clutch or, rather, the disengagement of the wedge-shaped projection from the groove, followed by its re-engagement when the power take-off continues to be driven—and the repetition of these processes—cause a noise likely to draw the user's attention to this malfunction. Such a malfunction may, for example, be encountered when the stop for the closed or open position of the slat curtain has not been fixed in correct position during installation or when the correct position has been changed thereafter by improper handling.

Preferably, a plurality of wedge-shaped projections and matching wedge-shaped grooves are provided. This permits a symmetrical arrangement which enables any tilting, canting or jamming of the coacting parts to be prevented.

Other features and advantages of the invention will become apparent from the claims and the following description of one example of the invention when read in connection with the drawings which show certain details essential to the invention. The individual features may be realized in any embodiment of the invention either individually or in any desired combination.

Figure 1:
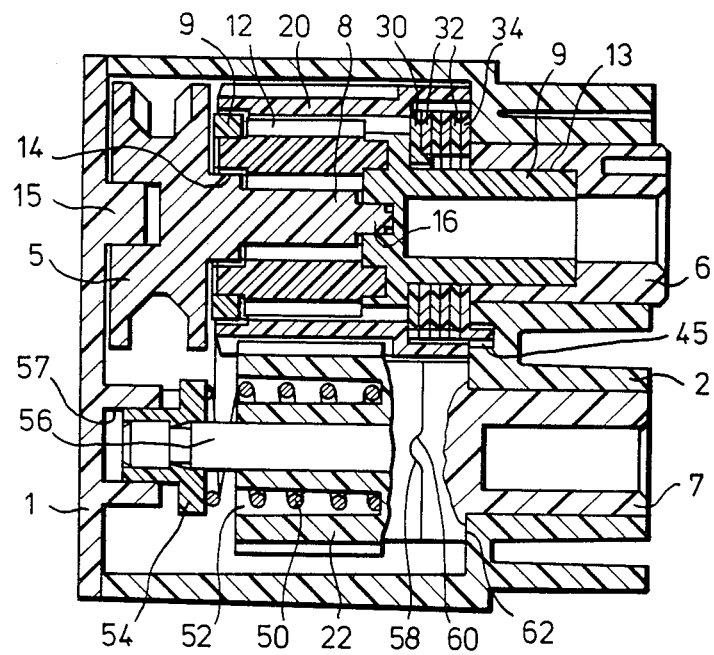
FIG. 1 shows a longitudinal section through the driving mechanism.

The arrangement shown in FIG. 1 comprises two housing parts 1 and 2 which enclose the gearing and which are connected with each other in a manner not shown in the drawing. The mechanism is driven by a drive wheel 5, via a bead chain. Instead of using a bead chain, one could also drive the mechanism by means of an articulated crank or electric motors. A tilt rod 6 and a transport rod 7 serve to drive the tilt device and the transport device of a slat curtain that can be fixed to the side of the housing opposite the drive wheel 5. The tilt device and the transport device can be fixed in axial openings of the tilt rod 6 and the transport rod 7, for rotation therewith. The individual slats of the curtains are suspended for being displaced and tilted within the hollow section forming the track of the slat curtain, by means of carriages mounted to slide within the said hollow section. Usually, the slats are vertically suspended from the track. The tilt device acts to rotate the individual slats about their longitudinal axis, while the transport device acts to displace the slats transversely to their longitudinal axis during opening or closing of the curtain.

Fixed to the driving wheel 5, i.e. formed as an integral part thereof, is a sun wheel 8. A planet carrier or cage 9 seated to rotate about the same axis carries on its bearing pins four rotatable planet wheels 12 engaging the sun wheel 8. The end of the cage 9 engages a recess 13 extending in axial direction in the tilt rod 6 so that it is held thereon. The recess 13 is provided with strip-like projections engaging grooves 14 provided in the right-hand portion of the cage 9—as viewed in FIG. 2—so that the connection is fixed against rotation. The left end portion of the cage 9—as viewed in FIG. 1—is supported by a shoulder 14 of the driving wheel 5 which is in turn supported by a king pin 15 fixed to the housing part 1. The right end of the sun wheel 8 is provided with a king pin 16 which engages a bore in the cage 9.

The planet wheels 12 are enclosed by an outer wheel 20 which has its internal toothing in engagement with the planet wheels. The outer wheel 20 is further provided with an external toothing which engages a gear 22 whose rotary movement is transmitted to the transport rod 7.

Figures 2, 3:
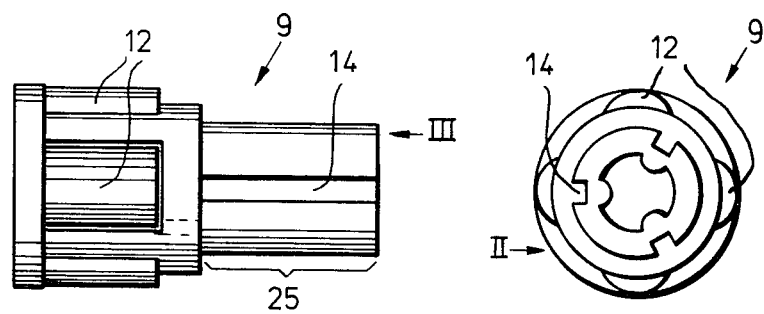
FIG. 2 shows the planet carrier, viewed in the direction of arrow II in FIG. 3.
FIG. 3 is an end view of the planet carrier, viewed in the direction of arrow III in FIG. 2.
Figure 4:
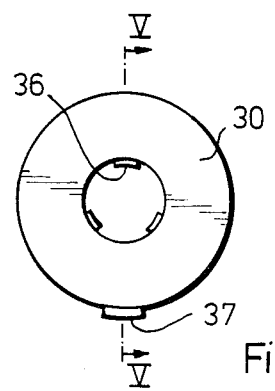
FIGS. 4 and 5 show a view and a cross-section through the extreme left disk in FIG. 1.
Figure 5:
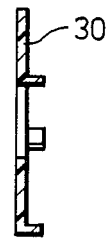
Figure 6:
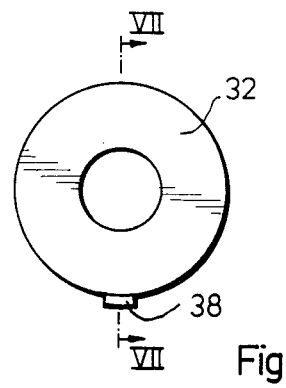
FIGS. 6 and 7 show a view and a cross-section through the following four disks in FIG. 1.
Figure 7:
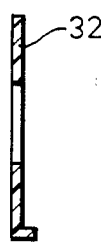
Figure 8:
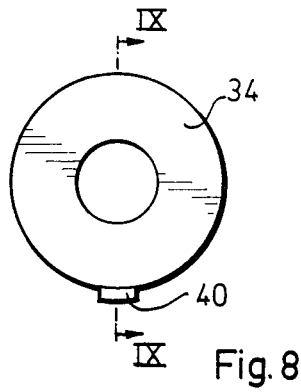
FIGS. 8 and 9 show a view and a cross-section through the extreme right disk in FIG. 1.
Figure 9:

The right-hand—as viewed in FIG. 2—shaft-like portion 25 of the cage 9 carries from the left to the right—as viewed in FIG. 1—a total of six disks, namely a first outermost disk 30—see FIGS. 4 and 5—followed by four disks 32—see FIGS. 6 and 7—and a further disk 34—see FIGS. 8 and 9—all disks being substantially circular. The first outermost disk 30 is connected with the cage 9, for rotation therewith, by three internal projections 36 engaging the grooves 14 of the shaft-like portion 25 of the cage 9. The first outermost disk 30 comprises an outer projection 37 which in the representation of FIG. 1 extends to the right into the plane of the neighboring disk 32. The latter does not have any inner projections, but only one outer projection 38 which again extends to the right into the plane of the directly neighboring disk 32, and so on. The further disk 34 located on the extreme right side is provided with a projection 40 of a somewhat greater length which likewise extends to the right—as viewed in FIG. 1—and engages a recess 45 in the housing part 2, whereby it is fixed to the housing 1, 2 against rotation. Each of the outer projections 37 and 38 extends over a small circumferential angle only. In the case of the projections 37 and 38 this angle is approximately 13°. The outer projections project radially beyond the circular outer edge of the disks 30, 32, 34. The idle path obtained in the device shown in FIG. 1 due to the arrangement described before is therefore equal to five full revolutions, minus 5×13°, totalling 1735°. The extreme right disk 32 in FIG. 1 is the other outermost disk in the meaning of the claims.

When the tilt rod 6 turning in one sense of rotation determined by the sense of rotation of the driving wheel 5 is prevented from being further rotated by the fact that all stops 37, 38 and 40 are in abutment with each other, the cage 9 comes to a standstill, and the driving wheel 5 starts driving, via the planet wheels 12, the outer wheel 20 which in turn drives the gear 22. The gear 22 is moved to the right—as viewed in FIG. 1—via a pressure spring 50 taking the form of a spiral spring which engages an annular recess 52 in the gear 22 closed on the right side, and which bears against a stop 54 fixed to a connected shaft 56 on which the gear 22 is rotatably seated. The left end of the shaft 56 is rotatably seated in a bore 57 in the housing part 1. The right portion—as viewed in FIG. 1—of the gear 22 which is free from any toothing comprises four radial substantially V-shaped grooves 58 arranged at a regular annular spacing of 90°, which grooves are engaged by V-shaped projections 60 provided on the transport rod 7. The transport rod 7 comprises an annular shoulder 62 which bears against the housing part 2. The right end of the shaft 56—which is not visible in FIG. 1—is formed as an integral part of the transport rod 7. The fact that the gear 22 is pressed by spring force against the transport rod 7 permits a torque to be transmitted from the gear 22 via the projections 60 and the associated grooves 58 to the transport rod 7. The magnitude of the transmitted torque is determined by the force of the spring 50, the wedge angle of the wedge-shaped projection 60 and the material properties of the parts 22 and 7 which consist of a plastic material. The groove 58 and the projection 60 are not exactly wedge-shaped, but rounded in the area of the point of the wedge, to simplify their production and also to reduce wear.

All parts of the device shown in FIG. 1, except for the spring 50, are made from plastic material. The disks 30 to 34 have an outer diameter of about 18 mm, and each of the projections 37, or 38, or 40 projects approximately 0.8 mm beyond this outer diameter. The thickness of each of the disks 30 to 34 is 1.6 mm. In the example described before, the disks are made from a plastic material.

The device shown in FIG. 1 has a total height of about 45 mm and a total length, measured in the horizontal direction of FIG. 1, of about 49 mm. The other dimensions may be taken from the drawings which are true to scale.

The reference numbers included in the claims are not meant to restrict the claims in any way, but rather intended to facilitate their understanding.

I claim:

1. A driving mechanism for slat curtains, the slats of which can be displaced in a direction transverse to their longitudinal axis and rotated about the longitudinal axis of the slats, comprising:
    a planetary gearing having one drive end and two power take-offs of different torque for connection to a transport rod, effecting the longitudinal displacement of the slats, and a tilt rod effecting their rotary movement, the planetary gearing comprising a driving wheel formed with a sun wheel, a planet carrier carrying planet wheels engaging said sun wheel, and an outer wheel enclosing said planet wheel and having an internal toothing in engagement with said planet wheels, said planet carrier further having a shaft-like extension portion provided with grooves engaged by projections in a recess in the tilt rod, providing thereby a connection between the shaft-like projection and said tilt rod which is fixed against relative rotation, a plurality of rotatable disk means, each formed with a central opening for mounting on said shaft-like portion of the planet carrier, said disk means being of substantially identical diameter and being arranged in parallel abutting relation on the shaft-like portion, one of said plurality of disk means, being that one closest to said driving wheel, having radial projections in its central opening for also engaging said grooves in said shaft-like projection on the planet carrier thereby enabling said one of said disk means to rotate with said planet carrier, each of said plurality of disk means further having a projection serving as a stop for limiting rotary movement of the tilt rod on rotation of the power take-off associated therewith, each stop projection on each of said disk means extending from an edge thereof substantially perpendicularly to the plane of the disks means and into the plane of an adjacent disk means, the length of the projection being maximally equal to the thickness of the disk means, and a stop fixed to the housing for limiting rotary movement of that one of said rotatable disk means most distant from said driving wheel.

2. The driving mechanism of claim 1, wherein the stop for said most distant rotatable disk means is in the form of another coaxial disk means having a projection fixed to the housing thereby fixing said another disk means against rotation, said fixed another disk means being even more distant from the driving wheel than said most distant rotatable disk means.

3. The driving mechanism of claim 1, wherein the outer wheel has an external toothing engaging a gear which is aligned with the transport rod, said gear being in driving connection with the transport rod via a slipping clutch which comprises a first clutch part which is driven by said gear and pressed by a spring against a drive element for the transport rod, the two parts of the slipping clutch being pressed together by the action of the spring and being coupled for rotation with each other by at least one wedge-shaped projection on one of the slipping clutch parts engaging a wedge-shaped groove of matching form on the other clutch part, the projection being adapted to slip out of the groove when a predetermined torque is exceeded.

* * * * *